Patented Jan. 2, 1923.

1,441,130

UNITED STATES PATENT OFFICE.

WALTER O. SNELLING AND WILLIAM R. LAMS, OF ALLENTOWN, PENNSYLVANIA, ASSIGNORS TO TROJAN POWDER COMPANY, OF NEW YORK, N. Y., A CORPORATION OF NEW YORK.

METHOD OF TREATING UNDRIED ORGANIC NITRATES.

No Drawing. Application filed April 27, 1921. Serial No. 464,982.

*To all whom it may concern:*

Be it known that we, WALTER O. SNELLING and W. R. LAMS, citizens of the United States, and residents of Allentown, Lehigh County, Penna., have invented certain Improvements in Methods of Treating Undried Organic Nitrates, of which the following is a specification.

Our invention relates to improvements in the treatment of porous and water-absorptive organic nitrates such as nitrocellulose and nitrostarch, for the purpose of reducing their water content without drying.

In an application filed January 21, 1921, by W. O. Snelling under Serial Number 439,054, a method has been described by which nitrostarch and like porous organic nitrates may be treated to reduce their water content without drying by displacing the water originally present by a concentrated solution of a water-soluble material, or by mixing such concentrated solution with the wet organic nitrate.

By the present invention we obtain a similar result by different procedure.

As an example of our present invention we will describe the method which we employ in making an improved explosive from nitrostarch. We first take nitrostarch as it comes from the centrifugal or wringer, and containing approximately 18% of water. We mix with this nitrostarch a sufficient amount of a solid hygroscopic material to unite with the water contained in the wet nitrostarch to form a solution. For example, to 100 lbs. of wet nitrostarch containing 18% or 18 lbs. of water, we may add 18 lbs. of dry ammonium nitrate. On carefully mixing the wet nitrostarch and the dry ammonium nitrate, the hygroscopic ammonium nitrate soon begins to deliquesce in moisture withdrawn from the nitrostarch, and after a few hours, the ammonium nitrate will completely dissolve in the water which it has withdrawn from the wet nitrostarch. As rapidly as the ammonium nitrate liquefies, however, it diffuses through the nitrostarch, so that at the end of a period of standing of some hours we have nitrostarch now wet with a concentrated solution of ammonium nitrate, instead of being wet with water alone as in its original condition.

Upon bringing this material on a filter bed and applying suction, or by placing it in a centrifugal or whizzer, it will be found that some of the liquid adhering to the material can be drawn off. Although the nitrostarch in its original wet condition could not have its water content reduced below 18% by whizzing, yet the material in its present condition can be whizzed until it contains only about 18% of liquid, and if this liquid contains approximately 50% of water and approximately 50% of ammonium nitrate, it will be evident that by now whizzing the material its water content can be reduced without drying to approximately 9%.

As nitrostarch containing 18% of water is too insensitive for use without drying in the manufacture of explosives, but nitrostarch containing from 9% to 15% of water yields explosives of high brisance and satisfactory sensitiveness when mixed with suitable nitrates, chlorates, or other bodies, it will be evident that by the above disclosed method important advantages in the manufacture of explosives may be realized.

In the practice of our present invention we prefer to first remove as much water as possible from ordinary wet nitrostarch by means of suitable filtration, or by means of centrifugal action. We may, however, as alternative methods, employ pressure, or any other equivalent method of reducing the water content without drying. By centrifugal action we find that we can reduce the water content of the wet nitrostarch from 15% to 20% of the total weight of the material. We prefer to then pulverize or rub up the material capable of forming concentrated solutions with water, and thoroughly mix with the wet nitrostarch. Although ammonium nitrate is our preferred material, we may of course use calcium nitrate, calcium chloride, sodium chlorate, or any other material of hygroscopic nature and possessing high solubility in water. We allow the mixture to remain together for a sufficient length of time so that the hygroscopic material will withdraw the water from the wet nitrostarch and will unite with same to form a solution, this solution then wetting or filling the pores of the nitrostarch, in the same manner that the water originally did. Because of the increased volume of the solution which now exists, it is possible to remove a portion of this solution by whizzing or by other appropriate treatment, and we prefer to subject our material to a strong whizzing action, for the purpose of removing as much of the liquid as possible.

In the manufacture of explosives in which the finished product is to contain a hygroscopic salt of high water solubility, the procedure described furnishes a valuable step in the process, and where the ultimate amount of such ingredient is greater than that required for the procedure described, we can add the excess with said required amount. For example, we may take 100 lbs. of nitrostarch containing 18% of water, and add to this 50 lbs. of dry ammonium nitrate. After thorough mixing, the well-incorporated materials are left together for a period of about 24 hours. On now subjecting the mixture to strong centrifugal action, it will be found that a considerable amount of a concentrated solution of ammonium nitrate can be whizzed out, thus removing the amount of water contained in such concentrated solution from the mixture. There will remain a mixture containing nitrostarch and solid ammonium nitrate, the exact composition of this mixture depending upon the extent of the centrifugal action. This composition made as above with strong centrifugal treatment shows a percentage composition of from 55% to 65% nitrostarch on the dry basis, from 7% to 13%, of water, and from 25% to 35% of ammonium nitrate on the dry basis. Of course the ammonium nitrate will actually be present in part as dry ammonium nitrate, and in part as a concentrated solution of ammonium nitrate filling the pores of the mixture. The mixture as so prepared is an explosive of considerable strength and high brisance.

In the practice of our invention we prefer, however, to add only such an amount of hygroscopic water-soluble material as will unite with all of the water present in the wet nitrostarch to form a concentrated solution, since in general any additional material which remains undissolved will tend to hold back a portion of the liquid in the whizzing operation. Then after whizzing as much of the liquid out as is possible we add an additional quantity of the water-soluble hygroscopic material, in those cases where we desire to have an excess of this material present in the finished explosive.

It will be evident that in the practice of our invention, we may use instead of a single hygroscopic water-soluble material, a mixture of water-soluble hygroscopic materials, as for example a mixture of ammonium nitrate and calcium nitrate, and it is not necessary that we should add the same hygroscopic material which we use in reducing the water content in the final step of mixing the product so obtained with other salts or explosive constituents. For example, we may mix wet nitrostarch with solid calcium nitrate in the operation of reducing the water content without drying, and we may then mix the materials so produced with another hygroscopic water-soluble material, such as ammonium nitrate, in the preparation of our finished explosive. It will also be evident that other constituents commonly used in explosives, including stabilizing agents such as diphenylamine, anti-acid constituents, such as calcium carbonate, oxidizing agents, such as sodium nitrate and such combustible agents as wood pulp, may be used. The equivalents of all of these materials may also be used, without departing from the spirit of our invention.

While we have illustrated our invention as applied to the treatment of nitrostarch, we do not, in its broader aspect, wish to be limited to that particular organic nitrate, as the process is broadly applicable to porous wet organic nitrates, including nitrocellulose.

The term "hygroscopic" employed both in description and claims is to be considered as defining materials which will be hygroscopic under the particular existing conditions.

We claim:

1. The method of treating wet materials to reduce the water content, which comprises contacting the same with a water-soluble, hygroscopic solid material until at least a portion of said last named material has dissolved in the water present in the wet material and then withdrawing a portion of the solution thus obtain.

2. The method of treating wet solid organic nitrates, which comprises contacting the same with a water-soluble hygroscopic solid material until at least a portion of the latter has liquefied and withdrawing a portion of the liquid so produced.

3. The method of manufacturing wet explosives containing an organic nitrate and an inorganic salt, which comprises contacting the undried organic nitrate with the solid hygroscopic inorganic salt until at least a portion of said salt has liquefied, and removing a portion of the liquid.

4. In the manufacture of explosives from wet nitrostarch, the process which comprises contacting wet nitrostarch with a solid hygroscopic body and thereby increasing the amount of liquid present without increasing the amount of water and thereafter removing a portion of the increased amount of liquid so produced.

5. In the treatment of wet nitrostarch to reduce the amount of water present, the process which comprises bringing wet nitrostarch in contact with a solid hygroscopic body until the amount of liquid present in the nitrostarch has become increased, and thereafter reducing the amount of water present in such nitrostarch by removing a portion of the liquid so produced.

6. In the manufacture of explosives, the process which comprises applying centrifugal action to wet nitrostarch to remove the excess of water present, and then contacting the material so treated with a water-soluble hygroscopic solid material until at least a portion of such water-soluble hygroscopic solid material has united with part of the water present in the nitrostarch to form a liquid, and then removing a portion of the liquid so produced by centirfugal action.

7. In the manufacture of wet nitrostarch explosives, the procedure which comprises removing as by centrifugal means the excess water in the undried nitrostarch, adding solid ammonium nitrate, maintaining said contact until sufficient of said nitrate has liquefied to permit removal of a portion thereof by centrifugal means and thereby reduce the water content of the mixture to the desired amount, and so removing said portion of liquefied ammonium nitrate.

WALTER O. SNELLING.
WILLIAM R. LAMS.